Dec. 7, 1926.

F. CRISMAN

NUT LOCK

Filed April 17, 1926

1,609,509

INVENTOR.
Fred Crisman.
BY
ATTORNEY.

Patented Dec. 7, 1926.

1,609,509

UNITED STATES PATENT OFFICE.

FRED CRISMAN, OF DENVER, COLORADO.

NUT LOCK.

Application filed April 17, 1926. Serial No. 102,723.

This invention relates to certain improvements in nut locks and it is an object of the invention to provide a device of this kind which operates effectively to hold the nut from displacement or backing off as a result of vibration or jars.

Furthermore, it is an object of the invention to provide a device of this kind formed from a single length of wire and constructed in a manner to surround or embrace a bolt outwardly of the nut and having its extremities formed for coaction with the threads of the bolt to maintain the device in applied position and in a manner to hold the nut against backward or turning off movement.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1:
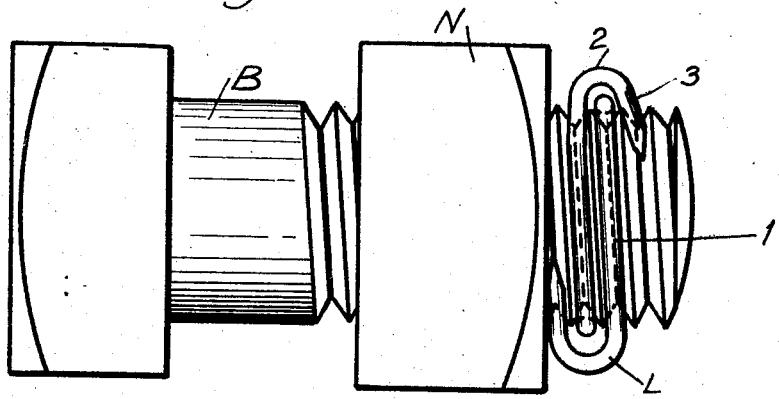
Figure 1 is a view in elevation illustrating a nut lock constructed in accordance with an embodiment of my invention in applied position.

As disclosed in the accompanying drawing, B denotes a bolt upon which is threaded the nut N, said nut being of any preferred type or design.

My improved lock, indicated in its entirety as L, is formed of a single length of wire of requisite gauge and possessing a certain degree of inherent resiliency. The central portion of the strand is bent to provide a loop 1 the free end portion of which being in overlying relation and which is adapted to be engaged with the thread of the bolt B outwardly of the applied nut N. One extremity of the loop 1 is provided with an outstanding and substantially radially disposed arm 2, the outer end portion of which being continued by a returned arm 3, the free extremity of which has close engagement within the thread of the bolt B outwardly of the loop 1 of the lock L, thus acting as a follower within the thread of the bolt to facilitate putting on or backing off the lock.

The arm 2 is preferably carried by the inner end of the loop 1 while the opposite or outer end is also continued by the outstanding and substantially radially disposed arm 4 continued by the returned arm 5. The arm 5 is also continued by a laterally disposed and substantially arcuate arm 6. which is adapted to be snugly received within the thread of the bolt B inwardly of the applied loop 1 and immediately adjacent to the outer face of the nut N. This arcuate arm 6 constitutes a wedge operating effectively to prevent retrograde or backing off movement of the nut and particularly when caused by vibration, jars and the like.

Figure 2:
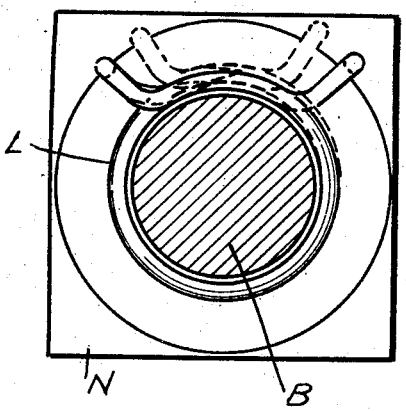
Figure 2 is a cross sectional view taken through the bolt as illustrated in Figure 1 outwardly of the nut and applied lock.
Figures 3, 4:
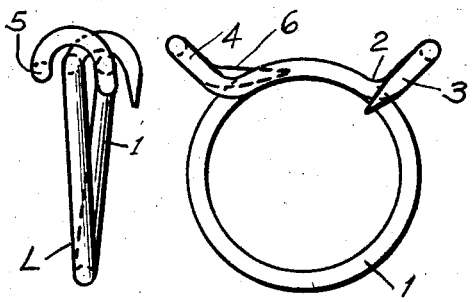
Figure 3 is a view in side elevation of the lock as herein disclosed.
Figure 4 is a view in front elevation of the lock as illustrated in Figure 3.

The arms 2 and 4 together with their returned arms 3 and 5 respectively provide outstanding members which, when pressed or moved one toward the other, result in an enlargement of the loop 1 to facilitate its application to or removal from the bolt B, said second positions of these arms being indicated by broken lines in Figure 2.

The coil 1 operates to give steadiness to the lock L when in working position and need not necessarily be closely or tightly engaged within the thread of the bolt. The lock L may be made of spring steel, brass or other suitable material which prevents corrosion when in applied position. When the bolt B. however, is made of steel it is of advantage to use a dissimilar material for the lock L to prevent adhering of the two metals.

As clearly illustrated in the accompanying drawing, the arms 4 and 6 are disposed inwardly one toward the other whereby the efficiency of the device is materially increased.

Ordinarily the lock L can be applied or removed by hand but when the lock is used in connection with a bolt of unusual size, a wrench or other method of leverage should be employed on account of the increased resistance.

If desired, the loop 1 may be provided with barbed projections to assist adhering to the bolt threads and thus further resisting the tendency of the nut N to back off.

From the foregoing description it is thought to be obvious that a nut lock constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A nut lock comprising a single length of resilient metal bent to form a spring loop, the extremities of the loop being continued by outstanding returned arms, the free extremity of one of said returned arms being continued by a laterally disposed arcuate arm constituting a wedge member, the arcuate arm being arranged at one side of the loop and the free extremity of the second returned arm being at the opposite side of the loop, the arcuate arm and the free extremity of the second returned arm being disposed inwardly with respect to the loop one toward the other, said outstanding returned arms at the extremities of the loop providing members which, when moved one toward the other, expand the loop.

In testimony whereof I hereunto affix my signature.

FRED CRISMAN.